July 14, 1953
V. R. PARKS
2,645,127
SHORTENING MEASURE
Filed Aug. 20, 1951
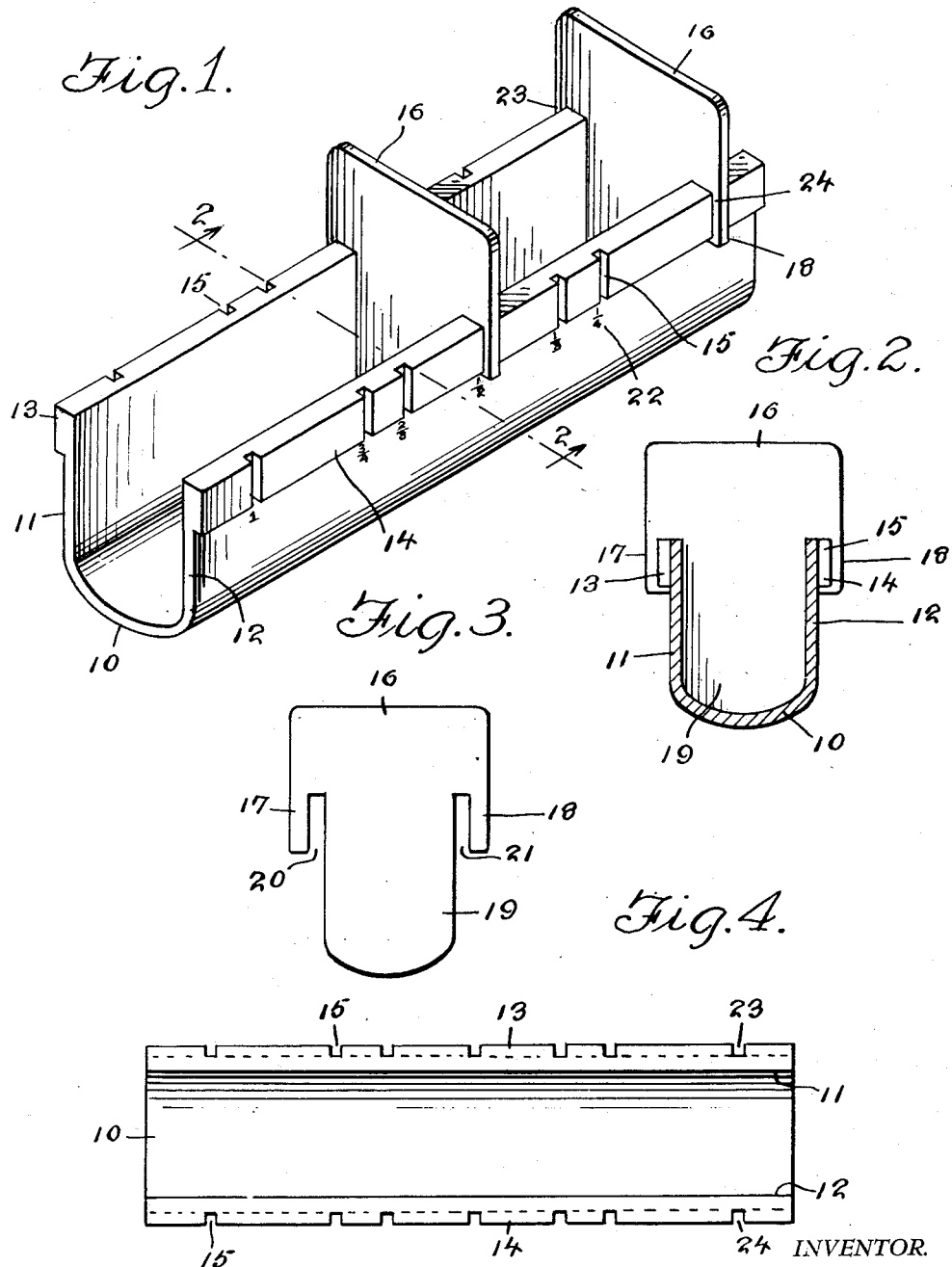
INVENTOR.
Vergil R. Parks Patented July 14, 1953

2,645,127

UNITED STATES PATENT OFFICE 2,645,127

SHORTENING MEASURE

Vergil R. Parks, Sierra Madre, Calif.

Application August 20, 1951, Serial No. 242,764

1 Claim. (Cl. 73—429)

This invention relates to measuring and dividing devices wherein products and particularly products in paste form may be quickly and at the same time accurately measured by dividing partitions removably positioned in a trough like member.

The purpose of this invention is to provide a measuring device particularly adapted for products in paste form whereby both ends of the measuring device may be removed to facilitate removing products therefrom.

In the conventional method of measuring paste products such as shortening in the kitchen where one-third, or other parts of a cup of shortening are required it is necessary to place the product in a cup and guess at the amount. With this thought in mind this invention contemplates a measuring device in the form of a trough with spaced notches in beads on the edges and with partitions adapted to be positioned in the notches for forming compartments that accurately measure a fraction of a cup or the like.

The object of this invention is, therefore, to provide means for forming a measuring device with dividing partitions wherein the partitions are readily adjustable to change the size of a compartment therein and also wherein the partitions are removable to facilitate removing the product from the measure.

Another object of the invention is to provide an accurate measuring device for measuring fractions of a cup of paste products in which the parts are readily removable whereby the device may readily be cleaned.

A further object of the invention is to provide an adjustable accurate measuring device for paste products which is of a simple and economical construction.

With these and other objects and advantages in view the invention embodies a trough, substantially U-shaped in cross section, with beads on the outer edges of the sides and with partitions having arms adapted to be inserted in notches in the beads for adjustably and accurately positioning the partitions in the trough.

Other features and advantages of the invention will appear from the following description taken in connection with the drawings wherein:

Figure 1 is a perspective view illustrating the design and arrangement of the measuring device.

Figure 2 is a cross section through the measuring device taken on line 2—2 of Figure 1.

Figure 3 is a detail illustrating one of the partitions used in the measuring device.

Figure 4 is a plan view of the trough or body of the measuring device.

Referring now to the drawings wherein like reference characters denote corresponding parts the improved measuring device of this invention includes a trough, substantially U-shaped in cross section having an arcuate base 10 with upwardly extended side walls 11 and 12, with beads on the upper outer edges of the side walls as indicated by the numerals 13 and 14, and with spaced notches 15 in the beads 13 and 14, and the device is provided with partitions 16 having arms 17 and 18 which are positioned to be received in the notches with a tongue 19 nested in the body of the trough.

The partitions 16 are provided with recesses 20 and 21 that are positioned to receive the upper edges of the side walls of the trough with the arms 17 and 18 in the notches 15.

The sides of the trough may be provided with indicia, as indicated by the numeral 22 representing a fraction of a cup or other measuring device.

With the parts arranged in this manner one of the partitions or baffles 16 is placed in the end notches, as indicated by the numerals 23 and 24 to form the end of the measure and another partition is positioned with the arms in notches corresponding with the fraction of a measure or cup whereby with the partitions in notches as illustrated in Figure 1 the area in the trough between the two partitions is equal to one-half of a cup.

The area may be filled with shortening, flour, or other material and with the partitions removed the product may readily be removed from the trough and the trough may readily be cleaned.

It will be understood that modifications may be made in the design and arrangement of the parts and the device may also be used for other purposes without departing from the spirit of the invention.

What is claimed is:

In a measuring device, the combination which comprises an elongated trough U-shaped in cross section having an arcuate base with upwardly extended arms and having beads with spaced vertically positioned slots therein on the upper outer edges of the arms, and partitions having tongues shaped to correspond with the inner surface of the trough and arms positioned to extend into the vertically positioned slots of the beads of the side walls of the trough with the tongue nested in the trough.

VERGIL R. PARKS.

References Cited in the file of this patent

UNITED STATES PATENTS

| Number | Name | Date |
|---|---|---|
| 526,728 | McCelland | Oct. 2, 1894 |
| 597,188 | Nance | Jan. 11, 1898 |
| 890,351 | Frank | June 9, 1908 |
| 2,309,896 | Gustafson et al. | Feb. 2, 1943 |
| 2,498,981 | Darby | Feb. 28, 1950 |
| 2,569,703 | Weiland | Oct. 2, 1951 |